Patented Mar. 17, 1942

2,276,587

UNITED STATES PATENT OFFICE 2,276,587

WATER-SOLUBLE, HIGH MOLECULAR α-SUBSTITUTED ARALKYL AMINES AND THEIR MANUFACTURE

Carl Mettler, Henry Martin, Otto Neracher, and Alfred Staub, Basel, Switzerland, assignors to J. R. Geigy A. G., Basel, Switzerland No Drawing. Application November 10, 1939, Serial No. 303,906. In Switzerland November 25, 1938

14 Claims. (Cl. 260—457)

It has been found that the water-soluble, high molecular α-substituted aralkylamines, in consequence of their interesting properties represent a class of new technically very valuable compounds. They are prepared according to the methods being known for the manufacture of water soluble derivatives of amines, from the high molecular α-substituted aralkylamine bases being not or difficultly soluble in water. Thus compounds may be made e. g. by forming salts with acids or by partial or exhaustive alkylation and/or aralkylation, and if the reaction products are not quaternary, they can be converted into water-soluble derivatives by means of salt forming acids or by direct or indirect introduction of sulphonic acid groups.

The aralkylamines used as direct or indirect starting materials correspond to the following general formula:

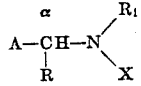

wherein R means alkyl, aralkyl or aryl, $R_1$ means hydrogen, alkyl, hydroxy-alkyl or aralkyl, X means hydrogen, alkyl, hydroxy-alkyl, aralkyl or acyl and A represents a substituted or unsubstituted benzene-, naphthalene- or partially hydrogenated naphthalene nucleus.

These α-substituted aralkylamines are made generally according to the Leukhart's process from arylketones by means of ammonium formate according to the following equations:

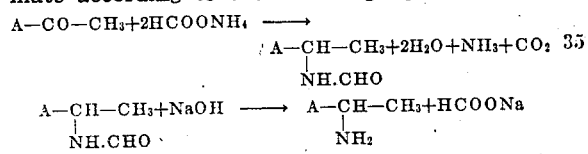

(A has the same meaning as indicated above.) or from the same ketones by catalytic hydrogenation in presence of ammonia. The arylalkylketones containing a saturated hydrocarbon radical with at least 8 C-atoms have proved especially valuable. As examples we may cite ketones made from benzene and palm-nut fatty acid, from toluene and palmitic acid, from dodecyl benzene and acetic acid, from naphthalene, tetraline or o-dichlorobenzene and palm-nut fatty acid, from anisole and capric acid and so forth. But also arylalkylketones with hydrocarbon radicals having less than 8 C-atoms can be transformed into technically valuable compounds, as for example acetophenone, butyrophenone or also arylaralkylketones, such as desoxy-benzoines.

All these α-substituted benzylamines prepared from arylketones are able to be converted by alkylation, hydroxyalkylation, aralkylation and/or acylation (with carboxylic acids or sulphonic acids) into derivatives of the said amines.

By alkylating or aralkylating agents there result from the new primary amines secondary, tertiary or also quaternary derivatives.

By a suitable selection of the alkylating or aralkylating agents mixed alkylated or aralkylated tertiary or quaternary amines may be obtained.

As alkylating or aralkylating agents there may be used for example alkyl halides such as chloromethyl, allylchloride, chloromethyldodecylether, alkylsulphates such as dimethyl- or diethylsulphate, sulphonic acid esters, hydroxyhalogenalkyls such as glycolchlorhydrine or glycerinechlorhydrines, halogencarboxylic acids, their esters or amides such as chloroacetic acid and its derivatives, halogenketones such as chloroacetophenone, ω-chloroacetophenone, halogenalkylnitrils, such as chloroacetonitril, halogenalkylrhodanides, benzylhalides such as benzylchloride, halogenbenzylhalides such as 3:4-dichlorobenzylchloride, halogenhydroxybenzylhalides and so forth, whereby all the said halogen compounds must contain reactive halogen. The so obtained secondary and tertiary bases form with acids water-soluble salts such as chlorhydrates, sulphates, oxalates, acetates, lactates and so forth. The quaternary compounds are also water-soluble.

Any organic carboxylic acids or sulphonic acids or their derivatives such as esters or halides, thus for example benzoylchloride, palm-nut fatty acid chloride, propionylchloride, phenoxyacetic acid chloride, phenylacetic acid chloride, naphthenic acid chloride, toluene sulphochloride, benzyl sulphonic acid chloride, tetraline sulphonic acid chloride and so forth may be converted with the said benzylamines into the corresponding acyl derivatives.

Aliphatic, araliphatic, aromatic or hydroaromatic carboxylic acids or sulphonic acids involve different technical effects. In order to always obtain a high molecular weight, high molecular acids may be caused to react with low molecular α-substituted benzylamines or low molecular acids may be caused to react with high molecular α-substituted benzylamines.

The α-substituted benzylamines or their alkyl and/or acylderivatives may be converted into sulphonic acids by means of the usual sulphonating agents, such as sulphuric acid, chlorosulphonic acid and also sulphuric acid containing sulphuric acid anhydride and so on. For the same purpose, however, all the other known methods for the direct or indirect introduction of sulphonic acid groups may be also applied. We only mention the reaction of water-insoluble benzylamines with sulphocarboxylic halides of the aliphatic or aromatic series, for example sulphobenzoic acid dichloride, with sulphoalkyl- or sulphoaralkyl alcohols, preferably as their esters etc.

Of course, the order of the sulphonation and of the other reactions, such as alkylation, acylation and so forth is immaterial. According to the conditions, one may introduce sulphonic acid groups either into the free or alkylated and/or acylated benzylamine or one may first introduce the sulphonic acid groups thereinto and then effect the alkylation and/or acylation.

The new compounds possess in part excellent capillar-active effects, such as for example a washing, equalising, dispersing or wetting effect. Therefore, they may be used as valuable agents in textile industry, and also in all other technical branches, where such auxiliary agents are required. Some of the new products are also usable as excellent lime-soap emulsifiers. A certain number thereof possesses yet other appreciable properties, for instance some of them yield with dyestuffs, containing acid groups, insoluble precipitates so that they can be used for rendering dyeings fast to water. Finally, a number of the new products can be used as insect combatting agents for example for moth-proofing, as disinfectants and also for the preparation of softening agents.

The following examples illustrate the invention, the parts being by weight, where nothing other is said:

*Example 1*

100 parts of laurophenone of the formula

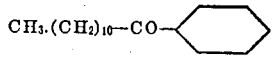

made from distilled palm-nut fatty acid, fraction B. P. 14mm. 150–220° C., and benzene are mixed with 70 parts of ammonium formate, made by neutralising 830 parts of formic acid of 85% strength with 1080 parts of ammonia of 25% strength and concentrating by evaporation 900–950 parts, and heated during 3–4 hours, with good stirring, up to 180–185° C. whereby water distils off; then the mixture is kept at this temperature for 5–6 hours. The resulting formyl compound of the α-undecylbenzylamine of the formula

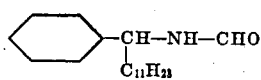

is saponified with 330 parts by volume of alcoholic caustic soda lye of 20% strength, the free amine is shaken out with ether and distilled; B. P. 14mm. 185–240° C. The amine is a bright oil readily soluble in diluted hydrochloric acid and having a strong basic smell.

(a) ½ mol. of α-undecylbenzylamine of the formula

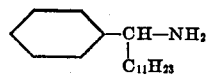

is dissolved in 800 parts by volume of dry chlorobenzene and 120 parts of solid sodium-carbonate are added thereto. At 100° C. 130 parts of dimethylsulphate are slowly added drop by drop and the mass is stirred over night at this temperature. The precipitated sodium sulphate is filtered off and a further 65 parts of dimethylsulphate added drop by drop to the filtrate containing the α-undecylbenzyldimethylamine of the formula

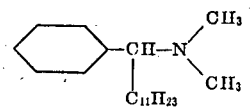

After heating to 100° C. for several hours the chlorobenzene is removed by distillation with steam and the clear solution of the quaternary ammonium compound of the formula

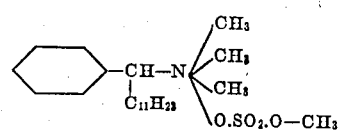

is evaporated to dryness. There remains a light colored tough paste, which dissolves easily in water and foams strongly.

Instead of producing the quaternary compound with dimethylsulphate, the α-undecyl-benzyl-dimethylamine can also be converted by means of hydrochloric acid into the water-soluble chlorhydrate. Likewise the sulphate, oxalate, acetate, etc. can be produced.

(b) 0.5 mol of α-undecyl-benzyldimethylamine made as described in the above paragraph a are mixed in 500 parts by volume of chlorobenzene with 0.6 mol. of glycerine-α-chlorhydrine and stirred at 100–110° C. for 12 hours. By distillation with steam the chlorobenzene is removed and the ammonium compound of the formula

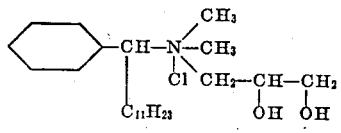

is obtained by evaporation of the clear aqueous filtrate. It forms a thick, light-yellow oil which foams strongly in aqueous solution.

(c) 0.2 mol. of α-undecylbenzyldimethylamine are mixed in a little round flask with exactly 0.2 mol. of allylbromide. The reaction occurs under strong self-heating up to 70° C. The obtained ammonium compound of the formula

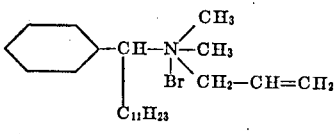

is soluble to a clear solution in water.

Instead of laurophenone a ketone of the naphthalene series, being accessible according to usual methods, such as for example napththalene-β-undecylketone, tetraline-β-hepta-decylketone etc. can be used.

*Example 2*

By causing palm-nut fatty acid chloride to react with cholorobenzene the corresponding 4-chlorolaurophenone of the formula

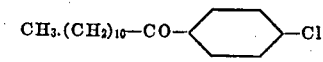

results according to Example 1. 134 parts of the said compound, dissolved in 1000 parts by volume of alcohol, are heated with 120 parts of dimethylamine in an autoclave to 210° C. for 20 hours.

After the evaporation of alcohol the 4-dimethylamino-laurophenone of the formula

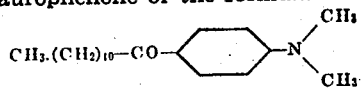

remains as a brown paste which is converted by means of ammonium formate into the 4-dimethyl-amino-α-undecyl-benzylamine of the formula

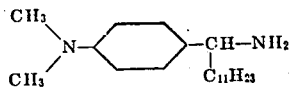

68 parts of 4-dimethylamino-α-undecyl-benzylamine are dissolved in 300 parts by volume of chlorobenzene, 60 parts of dimethylsulphate are slowly added and the whole is heated to 90° C. for 4 hours. To remove the chlorobenzene the reaction mixture is distilled with steam. Finally there results a clear aqueous solution which after evaporation yields the ammonium compound having the probable formula

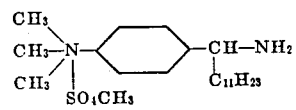

*Example 3*

1 mol. of stearophenone is dissolved in alcoholic ammonia (triple excess) and catalytically hydrogenated in the autoclave at 80–90° C. and 110 atm. After the catalyser has been filtered off and the alcohol has been evaporated the crude α-heptadecylbenzylamine of the formula

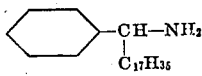

is distilled in a vacuo; B. P. $_{0.6}$ mm. 210°–212° C.

In 800 parts by volume of dry chlorobenzene ½ mol. of α-heptadecylbenzylamine is dissolved, 60 parts of solid sodium carbonate are added and 65 parts of dimethylsulphate are dropped in slowly at 90–100° C. After 12 hours the whole is mixed with the same volume of water and the chlorobenzene is removed by distillation with steam. By etherising the residue and by subsequent distillation in a vacuo the pure α-heptadecyl-benzyldimethylamine of the formula

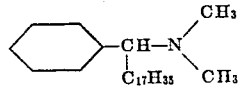

is obtained; B. P. $_{0.5}$ mm. 223° C.

By heating molecular proportions of α-heptadecyl-benzyldimethylamine and chloroacetic acid ethyl ester for 12 hours there is obtained an ammonium compound which is soluble in water to a clear solution and has the formula

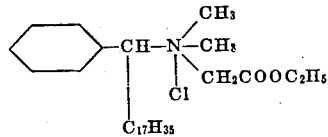

*Example 4*

200 parts of 4-methoxy-laurophenone of the formula

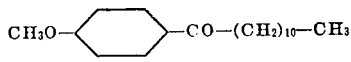

made from palm-nut fatty acid, fraction B. P. $_{14}$ mm. 170–220° C., and anisole are converted, as described in Example 1, with 130 parts of ammonium formate into the formyl compound of 4-methoxy-α-undecyl-benzylamine of the formula

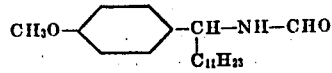

by heating for 10 hours to 180–185° C. By saponifying with alcoholic caustic soda lye the free amine is obtained; B. P. $_{1.5}$ mm. 200–250° C.

½ mol. of 4-methoxy-α-undecyl-benzylamine is dissolved in 700 parts by volume of dry chlorobenzene, 60 parts of solid sodium carbonate are added and 65 parts of dimethylsulphate are dropped in at 90–100° C. After having stirred at 100° C. for 12 hours, the chlorobenzene is removed by distillation with steam and the residue is shaken out with ether. The 4-methoxy-α-undecyl-benzyldimethylamine of the formula

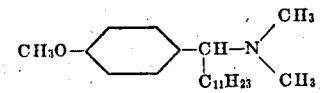

distils at 1.0 mm. pressure and 210–245° C.

If molecular quantities of 4-methoxy-α-undecylbenzyl-dimethylamine and 3:4-dichlorobenzyl-chloride are heated to 160–170° C. for 15 hours, a bright transparent resin is obtained which dissolves in water to a clear solution and has the following formula

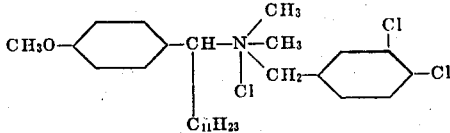

*Example 5*

200 parts of laurophenone are boiled under reflux for 5 hours with 200 parts of amalgamated zinc plate and 400 parts by volume of hydrochloric acid made from one part of concentrated acid and 2 parts of water. After each hour, further 50 parts by volume of hydrochloric acid are added. The mixture is then allowed to cool somewhat and the bright oil is separated out from the aqueous layer in the separating funnel and washed with hot water.

The dodecylbenzene of the formula

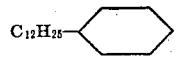

well dried in a vacuo is dissolved in 500 parts by volume of carbon disulphide, 120 parts of aluminium chloride are suspended therein and 100 parts by volume of acetic acid anhydride are slowly added drop by drop. The mixture is boiled for 10 hours under reflux until the development of hydrochloric acid is completed. Then it is poured onto ice, the precipitated aluminium-hydroxide may be dissolved with hydrochloric acid and the whole distilled with steam. The 4-dodecyl-acetophenone of the formula

etherised from the residue has a B. P. $_{0.5}$ mm. 180–270° C. and is a bright, slowly solidifying oil.

180 parts of 4-dodecyl-acetophenone are heated slowly together with 180 parts of ammonium formate to 185° C. and kept at this temperature over night. After saponification of the resulting formyl compound the free α-methyl-4-dodecyl-benzylamine of the formula

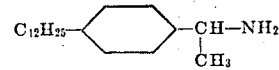

is obtained as a bright oil.

0.5 mol. of α-methyl-4-dodecyl-benzylamine are dissolved in 700 parts by volume of dry chlorobenzene, 60 parts of solid sodium carbonate are added and 65 parts of dimethylsulphate slowly introduced drop by drop thereinto at 90° C. After stirring for 10 hours at this temperature the precipitated sodium sulphate is removed by filtration and 77 parts of diethylsulphate are added slowly drop by drop at 100° C. to the clear chlorobenzene solution of the dimethyl-amine compound. The solution is kept for 5 hours at this temperature and the solvent is distilled off by means of steam. By evaporation the quaternary ammonium compound of the formula

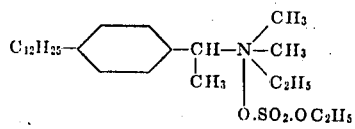

is obtained from the residue as a bright, thick oil.

Instead of diethylsulphate equimolecular proportions of chloroaceticester, allylbromide or chloroacetamide can also be used.

Instead of the quaternary compounds also salts, such as the chlorhydrate, the lactate, etc. can be produced.

*Example 6*

(a) 26.1 parts of the α-undecyl-benzylamine according to Example 1 are dissolved in 200 parts by volume of benzene and 16 parts of benzoylchloride are added while well stirring. The whole is boiled until the development of hydrochloric acid is completed requiring about 20-24 hours. The mixture is then for a short time distilled with steam to destroy the excess of benzoylchloride, the benzene solution is separated from the aqueous layer and freed from benzoic acid by washing with a diluted sodium carbonate solution. After having expelled the benzene, a light colored crystalline mass, the α-undecyl-N-benzyl-benzamide of the formula

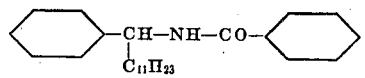

remains.

0.1 mol. of α-undecyl-N-benzyl-benzamide is dissolved at 0° C. in 100 parts of monohydrate and slowly sulphonated at this temperature with 40 parts of oleum of 26% strength. After 2 hours the sulphonation mass is poured on 500 parts of ice and neutralised at 0–10° C. with caustic soda lye. After concentration by evaporation and drying a dusty, light colored powder is obtained, the clear aqueous solution of which foams strongly.

(b) Instead of saponifying directly the formyl compound of the α-undecyl-benzylamine, described in Example 1, the said compound is isolated by etherising out and distilled. The nearly colorless oil has a B. P. 0.4 mm. of 215–270° C. and the formula

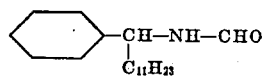

0.1 mol. of formyl-α-undecyl-benzylamine is dissolved at 0° C. in 100 parts of sulphuric acid monohydrate, 40 parts of oleum of 26% strength are slowly added thereto drop by drop at 0° C. with well cooling, the mixture is stirred at this temperature for 3 hours and poured on 500 parts of ice. The clear solution of the sulphonic acid is neutralised wth caustic soda lye and evaporated. A light colored powder is obtained which is easily soluble in water and foams strongly.

(c) 26.1 parts of the α-undecyl-benzylamine made as described above are boiled together with 20 parts of acetyl chloride under reflux for 5 hours, then water is added, the mixture shaken out with ether and the ethereal solution washed with a diluted sodium carbonate solution. After having expelled the ether a colorless oil remains, which solidifies gradually and has the formula

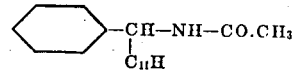

0.1 mol. of acetyl-α-undecyl-N-benzylamine is dissolved at 0° C. in 100 parts of sulphuric acid monohydrate and sulphonated with 40 parts of oleum of 26% strength exactly as indicated under 6a. The sodium salt of the new sulphonic acid is a light colored powder whose aqueous solutions strongly foam.

(d) 26.1 parts of the α-undecyl-benzylamine made as described above are boiled under reflux for 5 hours with 20 parts of n-butyrylchloride. The excess of acid chloride is decomposed with water, the formed n-butyryl-α-undecyl-N-benzylamine of the formula

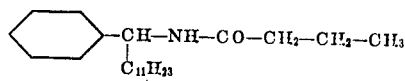

extracted with ether and the n-butyric acid washed out with a diluted sodium carbonate solution. The sulphonation of the crude n-butyryl-α-undecyl-N-benzylamine takes place in the same way as under 6c and yields a nearly colorless sodium salt which is easily soluble in water.

(e) 0.1 mol. of α-undecyl-benzylamine made as described above is boiled under reflux with 0.15 mol. of phenoxyacetic acid chloride in 200 parts by volume of absolute benzene until no more hydrochloric acid evolves. By a short distillation with steam the excess of acid chloride is destroyed, the benzene solution separated and the phenoxyacetyl-α-undecyl-N-benzylamine of the formula

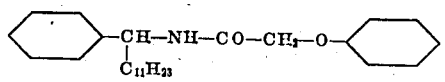

obtained by evaporating. The sulphonation as under 6c yields a colorless powder, which is easily soluble in water and gives strongly foaming solutions.

(f) 26.1 parts of the α-undecyl-benzyl-amine made as above described are converted by boiling for 6 hours under reflux with 25 parts of phenylacetic acid chloride into the phenylacetyl-α-undecyl-N-benzylamine of the formula

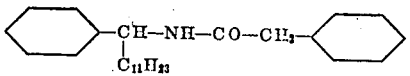

The phenylacetic acid chloride in excess is decomposed by water, the residue is extracted with ether and sulphonated in the same manner as described under 6c. The sodium salt of the sulphonic acid foams very strongly in aqueous solution.

(g) 0.1 mol. of α-undecyl-benzylamine is dissolved in 100 parts by volume of benzene and 50 parts by volume of pyridine and a solution of 0.15 mol. of salicylic acid chloride in 50 parts by volume of benzene is added drop by drop thereto. The reaction takes place under self-heating. After boiling for 2 hours under reflux the mixture is cooled down and the pyridine well washed out with diluted hydrochloric acid and water.

After distilling off the benzene the salicylic-acid-α-undecyl-N-benzylamide of the formula

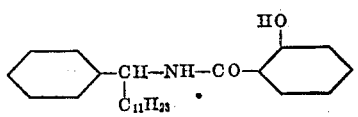

remains. The same is dissolved at 0° C. in 150 parts of sulphuric acid monohydrate and sulphonated by adding drop by drop 50 parts of oleum of 26% strength. After 3 hours the sulphonation is completed, the mass is poured on 600 parts of ice, neutralised with caustic soda lye and evaporated. A white powder is obtained, which is clearly soluble in water.

*Example 7*

(a) 261 parts of α-undecyl-benzylamine (according to Example 1) are dissolved in 1000 parts of dry chlorobenzene and 63 parts of solid sodium carbonate are added thereto. While well stirring 65 parts of dimethylsulphate are dropped in at 90–100° C. and the mixture is kept at this temperature for 12 hours. The solution must always react alkaline. By washing out the cooled solution with water the inorganic salts are removed and the N-methyl-α-undecyl-benzylamine of the formula

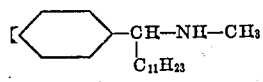

remains after distilling off the chlorobenzene in a vacuo. The same can be purified by distillation in a vacuo, B. P. 14 mm. 190–250° C., and is obtained in form of a bright oil.

0.1 mol. of the N-methyl-α-undecyl-benzylamine is dissolved in 100 parts of sulphuric acid monohydrate at room temperature and cooled down to 0° C. At this temperature 45 parts of oleum of 26% strength are slowly introduced and the mixture is stirred until a test is soluble to a clear solution in diluted caustic soda lye. Then it is poured on 500 parts of ice, neutralised and the sodium salt of the sulphonic acid is obtained by evaporation. This is a light colored powder whose aqueous solutions possess a good foaming power.

(b) 27.5 parts of N-methyl-α-undecyl-benzylamine made according to Example 7a are heated with 25 parts of benzoylchloride to 130–140° C. After 24 hours the mass is emulsified with hot water, distilled for a short time with steam and the residue shaken out with ether. The ethereal solution is freed from the benzoic acid by extracting with a diluted sodium carbonate solution, then it is evaporated and the crude N-methylα-undecyl-N-benzyl-benzamide of the formula

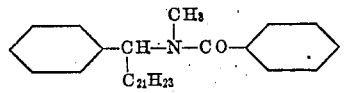

sulphonated under the conditions given under 6a. After the neutralisation a light colored easily soluble powder of the sodium salt is obtained.

(c) 0.1 mol. of the N-methyl-α-undecyl-benzylamine made according to 7a is boiled under reflux for 6 hours with 0.2 mol. of acetic acid chloride, then intermixed with water, the mixture shaken out with ether and the ethereal solution washed with a diluted sodium carbonate solution. The ether is distilled off and the remaining bright oil, i. e. the N-acetyl-N-methyl-α-undecyl-benzylamine of the formula

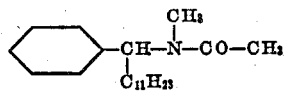

sulphonated according to the prescription given under 6a. The sodium salt of the sulphonic acid is very easily soluble in water and the solution exhibits a remarkable foaming power.

(d) 55 parts of the N-methyl-α-undecyl-benzylamine made according to 7a are converted according to prescriptions of Example 6c with 42 parts of phenoxyacetic acid chloride into the N-phenoxy-acetyl-N-methyl-α-undecyl-benzylamine of the formula

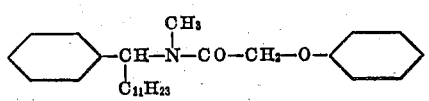

The latter is dissolved at room temperature in 250 parts of sulphuric acid monohydrate and sulphonated with well cooling at 0° C. with 75 parts of oleum of 26% strength, until a test gives a clear solution in diluted caustic soda lye. After neutralisation with caustic soda lye, the evaporation yields a light-brown powder, whose aqueous solutions foam.

(e) 27.5 parts of the N-methyl-α-undecyl-benzylamine made according to 7a are caused to react according to Example 6f with 26 parts of phenyl-acetic acid chloride and the reaction product is sulphonated. The potassium salt of the sulphonic acid of the N-phenyl acetyl-N-methyl-α-undecyl-N-benzylamine of the formula

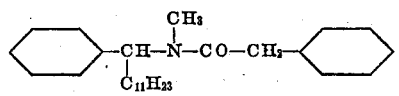

is very soluble in water and forms foaming solutions.

(f) 0.1 mol. of N-methyl-α-undecyl-benzylamine made according to Example 7a is dissolved in 100 parts of benzene and 50 parts of pyridine and a solution of 0.15 mol. salicylic acid chloride in 50 parts of benzene is dropped therein. The mixture heats up itself and is boiled for 3 hours under reflux, then water is added, the pyridine is washed out with diluted hydrochloric acid and the benzene distilled off. The crude N-methyl-N-(α-undecyl-benzyl)-salicylic acid amide of the formula

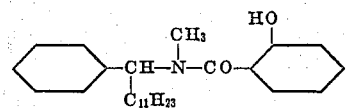

is sulphonated according to Example 6g and yields a sodium salt, which is easily soluble in water and whose solutions have good foaming properties.

*Example 8*

(a) 310 parts of 4-methyl-lauroylbenzene of the formula

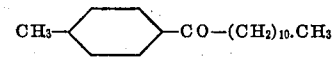

made from palm-nut fatty acid, fraction B. P. 14 mm. 150–220° C., and toluene are caused to interact according to Example 1, with 210 parts of ammonium formate to yield the formyl compound of 4-methyl-α-undecyl-benzylamine of the formula

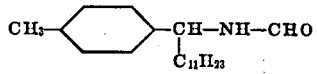

and the latter is saponified. The free base boils at 0.8 mm. pressure and 180–220° C.

27.5 parts of 4-methyl-α-undecyl-benzylamine are heated with 13 parts of benzylchloride to 150–160° C., until the development of hydrochloric acid is completed. Then the crude 4-methyl-α-undecyl-dibenzylamine of the formula

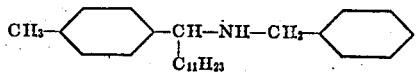

is dissolved at room temperature in 110 parts of sulphuric acid monohydrate, cooled down to 0° C., 50 parts of oleum of 26% strength are slowly added thereto and the whole is stirred until a test dissolves to a clear solution in diluted caustic soda lye. The mixture is poured on 600 parts of ice and neutralised with potassium hydroxide. A light-brown powder is finally obtained, whose aqueous solutions are strongly foaming.

(b) ½ mol. of the 4-methyl-α-undecyl-dibenzylamine, described under 8a, is dissolved in 1000 parts of dry chlorobenzene and 63 parts of solid sodium carbonate are added thereto. While well stirring 65 parts of dimethyl-sulphate are added drop by drop at 90–100° C. and the mixture is kept at this temperature for 12–15 hours. After cooling down the chlorobenzene solution is washed with water, the solvent is removed in a vacuo and the obtained tertiary base of the formula

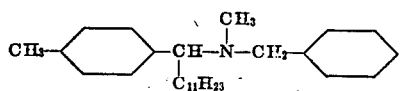

distilled, B. P. $_{0.5\ mm.}$ 170–215° C. By sulphonating according to the prescriptions in Example 8a a light colored powder is obtained, which is readily soluble in water.

Instead of dimethylsulphate diethylsulphate or a chlorhydrine such as glycolchlorhydrine may also be used for the alkylation.

(c) 0.1 mol. of the 4-methyl-α-undecyl-benzylamine, described under 8a, is heated with 0.15 mol. of glycerine-α-chlorhydrine (or glycolchlorhydrine) to 150–160° C., until no more hydrochloric acid escapes. The mixture is shaken up with ether, the excess of chlorhydrine is washed out with water and the residue remaining after having evaporated the solvent is dissolved in 100 parts of sulphuric acid monohydrate. At 0° C. 40 parts of oleum of 26% strength are added thereto drop by drop and the whole is stirred, until a test of the sulphonation mass dissolves to a clear solution in water. There is then poured on 500 parts of ice and neutralised with caustic soda lye. After concentration by evaporation a light-yellow powder is obtained, whose aqueous solutions possess marked capillaractive properties.

Example 9

28 parts of 4-methoxy-α-undecyl-benzylamine of the formula

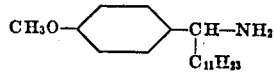

according to Example 4 are heated with 13 parts of benzyl-chloride to 150–160° C. until no more hydrochloric acid escapes. Then 20 parts of acetylchloride are added thereto drop by drop and the whole is boiled for 24 hours under reflux. The excess of acetic acid chloride is decomposed with water, the whole is extracted with ether and after evaporation of the solvent the remaining crude base of the formula

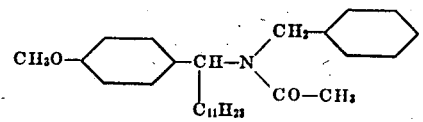

is dissolved at room temperature in 120 parts of sulphuric acid monohydrate. At —5–0° C. 50 parts of oleum of 25% strength are cautiously added and the whole is stirred at this temperature until a test has become water-soluble. Then it is poured on 600 parts of ice and neutralised with caustic soda lye. A light powder, very easily soluble in water, is obtained as final product.

Example 10

0.1 mol. of α-heptadecyl-benzyl-dimethylamine (see Example 3) is dissolved in 100 parts of sulphuric acid monohydrate and 50 parts of oleum of 26% strength are added thereto drop by drop at room temperature. The mixture is stirred until a test of the sulphonation mixture dissolves to a clear solution in diluted caustic soda lye, the whole is poured on 600 parts of ice, neutralised with caustic soda lye and the sodium salt of the sulphonic acid is obtained by evaporation. The same is a light-yellow powder, whose aqueous solutions foam weakly.

Example 11

26.1 parts of α-undecyl-benzylamine (see Example 1) are dissolved under cooling in 120 parts of sulphuric acid monohydrate and 40 parts of oleum of 26% strength are added thereto drop by drop at 0° C. Stirring is continued until a test dissolves to a clear solution in diluted caustic soda lye, which may be the case after about 2–3 hours. Then the mass is poured on 300 parts of ice and neutralised. While well stirring 8 parts of acetylchloride and 50 parts by volume of 2n-caustic soda lye are allowed to run simultaneously into the said solution. The solution should react alkaline. After the reaction is completed, the clear aqueous solution is evaporated and a colorless powder of the sodium salt of the sulphonic acid of α-undecyl-N-benzyl-acetamide of the formula

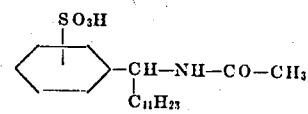

is obtained.

Example 12

210 parts of acetophenone are heated, while well stirring, with 200 parts of ammonium formate (see Example 1) to 180–185° C. The acetophenone distilling off is from time to time separated off and re-introduced into the reaction vessel. After 24 hours the reaction is complete; the formyl compound of the formula

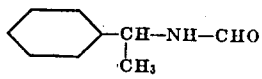

is shaken up with ether, isolated and distilled, B. P. $_{0.5\ mm.}$ 155–160° C. By alcoholic saponification the free α-methyl-benzylamine of B. P. $_{14\ mm.}$ 100–105° C. is obtained.

50 parts of α-methyl-benzylamine are slowly mixed with 90 parts of palm-nut fatty acid chloride and heated for 12 hours to 110°–120° C. until no more hydrochloric acid escapes. Then it is absorbed in ether, the fatty acid in excess is eliminated by means of caustic soda lye and the lauric acid-N-(α-methyl-benzyl)-amide of the formula

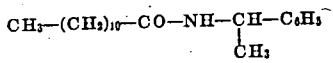

is distilled, B. P. 0.4 mm. 140–210° C. It forms a pale yellowish, slowly solidifying liquid.

70 parts of the said acid amide are dissolved at 0° C. in 150 parts of sulphuric acid monohydrate and 50 parts of oleum of 26% strength are slowly added thereto drop by drop. Stirring is continued until a test has become water-soluble, then the mixture is poured on 700 parts of ice and the clottedly precipitated sulphonic acid is separated off from the diluted sulphuric acid. The same is dissolved in water, neutralised with caustic soda lye, evaporated and a colorless powder is obtained, which is easily soluble in water.

Instead of acetophenone other acylated hydrocarbons of the benzene and naphthalene series, such as for example propiophenone, butyrophenone, amylphenylketone, naphthylmethylketone and so forth, may also be used.

*Example 13*

200 parts of lauroylbenzene of the formula

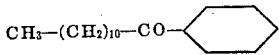

are boiled under reflux with 200 parts of amalgamated zinc plate and 400 parts of hydrochloric acid made from one part of concentrated acid and 2 parts of water. After each hour further 50 parts by volume of hydrochloric acid are added. After 5 hours the mixture is allowed to cool down somewhat, the bright oil is separated from the aqueous layer and is washed with hot water.

The dodecylbenzene of the formula

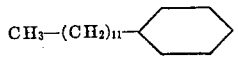

well dried in vacuo is dissolved in 500 parts by volume of carbon disulphide, 120 parts of aluminiumchloride are suspended therein and 100 parts by volume of acetic acid anhydride are added thereto drop by drop. It is boiled for 10 hours under reflux until the development of hydrochloric acid is completed. Then it is poured on ice, the precipitated aluminium hydroxide may be dissolved with hydrochloric acid and the whole distilled with steam. From the residue there is obtained by extracting with ether the 4-dodecyl-acetophenone of the formula

of B. P. 0.5 mm. 185–270° C., constituting a bright, slowly solidifying oil.

180 parts of 4-dodecylacetophenone of the formula

are slowly heated to 185° C. together with 140 parts of ammonium formate and kept at this temperature over night. After saponification of the obtained formyl compound the free 4-dodecyl-α-methyl-benzylamine of the formula

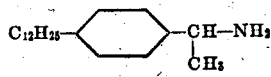

is obtained as a bright oil.

20 parts of benzoylchloride are added drop by drop to 32 parts of this base and the mixture is heated to 110–120° C. for 24 hours until no more hydrochloric acid escapes. Then it is dissolved in ether, the excess of benzoic acid is extracted with a diluted sodium carbonate solution and the ether is evaporated. The residue having the formula

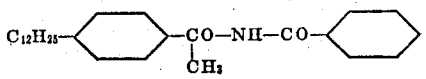

is dissolved at 0° C. in 100 parts of sulphuric acid monohydrate and 40 parts of oleum of 26% strength are slowly added thereto. When a test of the sulphonation mixture has been proved water-soluble, it is poured on 500 parts of ice and neutralised with caustic soda lye. A light powder is obtained, whose aqueous solutions are strongly foaming.

*Example 14*

½ mol. of 4-phenoxy-acetophenone of the formula

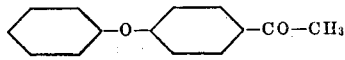

made by interacting acetylchloride with diphenyl-ether, is converted with 220 parts of ammonium formate into the 4-phenoxy-α-methyl-benzylamine of the formula

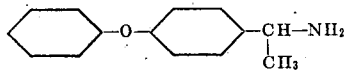

according to Example 1.

0.1 mol. of 4-phenoxy-α-methyl-benzylamine is dissolved in 100 parts of absolute benzene and 50 parts of pyridine and a solution of 19 parts of capric acid chloride is added thereto drop by drop. After heating for 6 hours under reflux the pyridine is washed out with hydrochloric acid and water, the benzene solution is dried and the solvent evaporated. The residue having the formula

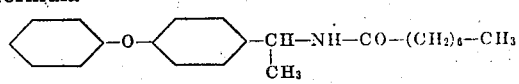

is sulphonated according to Example 8a and yields a nearly colorless product, whose aqueous solutions foam strongly.

*Example 15*

27.1 parts of 4-methyl-α-undecyl-benzylamine, made according to Example 8a, are dissolved in 100 parts by volume of absolute benzene and 50 parts by volume of pyridine. A solution of 20 parts of toluenesulphochloride in 100 parts of absolute benzene is dropped thereinto and the whole is boiled for 5 hours under reflux. After cooling down the pyridine is removed by washing out with diluted hydrochloric acid and the benzene is evaporated. The crystalline solidified residue having the formula

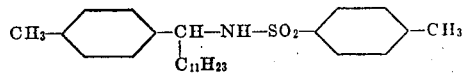

is powdered and introduced into 100 parts of sulphuric acid monohydrate and 60 parts of oleum of 26% strength are added at 0° C. After half an hour the sulphonation is completed and the mass is poured on 500 parts of ice. By liming the sulphuric acid is removed and the calcium salt of the sulphonation product is converted with sodium carbonate into the sodium salt. After evaporation it remains as a light colored powder, whose aqueous solutions are strongly foaming.

Example 16

26.1 parts of 4-methyl-α-undecyl-benzylamine (see Example 8a) are caused to react according to Example 14, with 20 parts of benzylsulphochloride and the compound thus obtained having the formula

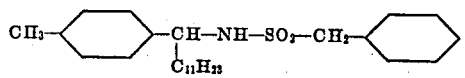

is sulphonated. A pale yellow product is obtained, which dissolves easily in water and has good foaming properties.

Example 17

26.1 parts of α-undecyl-benzylamine (see Example 1) are dissolved in 100 parts by volume of absolute benzene and 50 parts by volume of pyridine. A solution of 20 parts of toluenesulphochloride in 100 parts by volume of absolute benzene is dropped thereinto and the whole is boiled for 5 hours under reflux. After cooling down the pyridine is removed by washing out with diluted hydrochloric acid and the benzene is evaporated. The residue of the α-undecyl-benzyl-toluenesulphamide having the formula

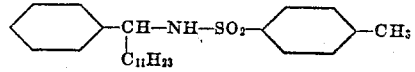

after drying in vacuo, is converted in presence of caustic soda lye with 65 parts of dimethylsulphate into the N-methyl-α-undecyl-benzyl-toluenesulphamide of the formula

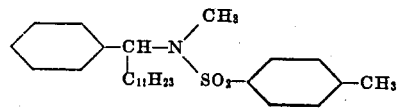

and sulphonated. A light colored powder, easily soluble in water, is obtained.

Example 18

26.5 parts of α-undecyl-benzylamine (see Example 1) are dissolved in 100 parts by volume of pyridine and a solution of 25 parts of tetralinesulphochloride in 100 parts by volume of absolute benzene is slowly added. Then it is boiled for 10 hours under reflux, the pyridine is removed with diluted hydrochloric acid and water and, after expelling the benzene, the remaining dark oil having the formula

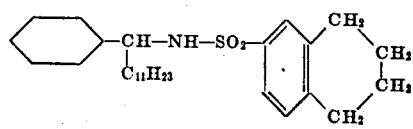

is dissolved in 100 parts of sulphuric acid monohydrate. 60 parts of oleum of 26% strength are added at 0° C. and, after 3 hours, it is poured on 600 parts of ice. By liming the sulphuric acid is removed and the calcium salt converted by addition of sodium carbonate into the sodium salt of the sulphonic acid of the N-(α-undecyl-benzyl)-tetralinesulphamide. Finally a rather dark, water-soluble powder is obtained.

Example 19

1 mol. of 4-methyl-desoxybenzoine of the formula

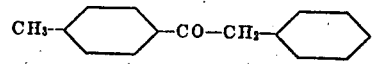

made from phenyl acetic acid chloride and toluene is caused to react with 180 parts of ammonium formate to give the α-benzyl-4-methyl-benzylamine of the formula

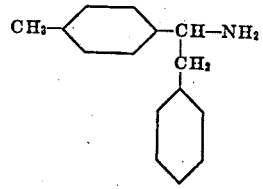

B. P. 14 mm. 178–180° C. according to Example 1.

20 parts of this base are added to 30 parts of stearic acid chloride. Under strong self-heating the mass becomes thick and it is stirred at 120–130° C. for a further 10 hours. Then the mass having the formula

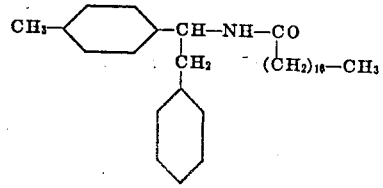

is dissolved in 150 parts of sulphuric acid monohydrate, cooled down to 0° C. and 60 parts of oleum of 26% strength are dropped thereinto. The light yellow, cream like mass is after 3 hours soluble in water; it is poured on 750 parts of ice and neutralised with caustic soda lye. After evaporation a colorless powder is obtained whose aqueous solutions are weakly foaming.

Instead of 4-methyl-desoxybenzoine the ketone capable of being prepared from hydrocinnamic acid chloride and benzene or toluene in the usual manner, can also be used.

Example 20

400 parts of ammonium formate are caused to interact, according to Example 1, with 300 parts of benzophenone and after saponification the α-phenyl-benzylamine of the formula

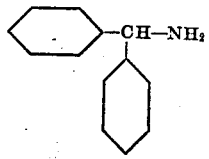

B. P. 14 mm. 163° C., is obtained.

36 parts of this base are mixed under under strong heating with 45 parts of palm-nut fatty acid chloride, the mixture is stirred at 100–110° C. for 12 hours and after cooling it is dissolved in ether. After washing with diluted caustic soda lye and water a crystalline mass, the lauric acid-N-(α-phenyl-benzyl)-amide of the formula

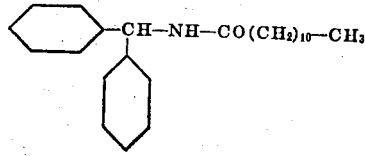

remains after expelling the ether. The same is dissolved at room temperature in 150 parts of sulphuric acid monohydrate and 60 parts of oleum of 26% strength are cautiously added thereto drop by drop at 0° C. The whole is stirred at this temperature for 5 hours, then a further 10 parts of oleum of 66% strength are added while stirring, until a test of the sulphonation mixture dissolves to a clear solution in diluted caustic soda lye. Thereupon it is poured on 750 parts of ice, neutralised with caustic soda lye and evaporated. The residue is a light colored powder, whose aqueous solutions possess strong foaming properties.

*Example 21*

26.1 parts of α-undecyl-benzylamine, described under 1, are heated together with 25 parts of benzylchloride-4-sulphonic acid in 200 parts of dichlorobenzene to 120–130° C., until no more hydrochloric acid escapes and the mixture has become homogeneous. The reaction mass is neutralised with caustic soda lye, separated from the dichlorobenzene and after evaporation a light brown powder is obtained, whose aqueous solutions are strongly foaming. It has the formula

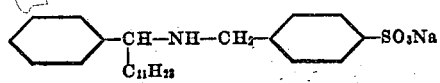

Instead of benzylchloride-4-sulphonic acid also chlorethane sulphonic acid may be used; the final product possesses similar properties.

*Example 22*

0.1 mol. of α-undecyl-benzylamine, described under 1, is dissolved in 250 parts of pyridine and 25 parts of m-sulpho-benzoyldichloride are added to the solution. The mixture is stirred at 80–90° C. for 12 hours until a test of the mixture dissolves to a clear solution in water. The greatest part of the pyridine is distilled off in a vacuo, the residue is dissolved in water and neutralised. After evaporating the clear solution a yellowish powder is obtained, whose aqueous solutions exhibit considerable foaming power. It has the formula

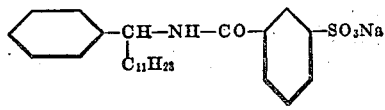

What we claim is:

1. A process for the manufacture of water-soluble, high molecular α-substituted aralkylamines, comprising starting from aralkylamines of the general formula

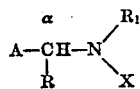

wherein R means a member of the group consisting of alkyl, aralkyl and aryl, R₁ means a member of the group consisting of hydrogen, alkyl, hydroxy-alkyl and aralkyl, X means a member of the group consisting of hydrogen, alkyl, hydroxy-alkyl, aralkyl and acyl and A represents a nucleus of one of the benzene and naphthalene series, these compounds containing a high molecular aliphatic radical of at least 8 C-atoms, and converting such α-substituted aralkylamines by solubilizing means into water-soluble derivatives thereof.

2. A process for the manufacture of water-soluble, high molecular α-substituted aralkylamines, comprising starting from aralkylamines of the general formula

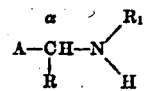

wherein R means a member of the group consisting of alkyl, aralkyl and aryl, R₁ means a member of the group consisting of hydrogen, alkyl, hydroxy-alkyl and aralkyl and A represents a nucleus of one of the benzene and naphthalene series, these compounds containing a high molecular aliphatic radical of at least 8 C-atoms, and converting such α-substituted aralkylamines into water-soluble derivatives thereof by means of at least one member of the group consisting of alkylating, hydroxyalkylating and aralkylating agents.

3. A process for the manufacture of water-soluble, high molecular α-substituted aralkylamines, comprising starting from aralkylamines of the general formula

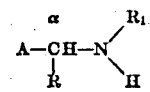

wherein R means a member of the group consisting of alkyl, aralkyl and aryl, R₁ means a member of the group consisting of hydrogen, alkyl, hydroxy-alkyl and aralkyl and A represents a nucleus of one of the benzene and naphthalene series, these compounds containing a high molecular aliphatic radical of at least 8 C-atoms, treating such α-substituted aralkylamines with at least one member of the group consisting of alkylating, hydroxyalkylating, aralkylating and acylating agents without forming ammonium compounds, and finally sulphonating the so treated compounds.

4. A process for the manufacture of water-soluble, high molecular α-substituted aralkylamines, comprising starting from aralkylamines of the general formula

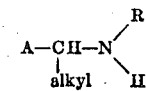

wherein alkyl means a high molecular aliphatic radical of at least 8 C-atoms, R₁ means a member of the group consisting of hydrogen, alkyl, hydroxy-alkyl and aralkyl and A represents a nucleus of one of the benzene and naphthalene series, and converting such α-substituted aralkylamines into water-soluble derivatives thereof by means of at least one member of the group consisting of alkylating, hydroxyalkylating and aralkylating agents.

5. A process for the manufacture of water-soluble, high molecular α-substituted aralkylamines, comprising starting from aralkylamines of the general formula

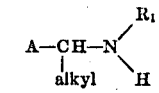

wherein alkyl means a high molecular aliphatic radical of at least 8 C-atoms, R₁ means a member of the group consisting of hydrogen, alkyl, hydroxy-alkyl and aralkyl and A represents a nucleus of one of the benzene and naphthalene series, and treating such α-substituted aralkylamines with at least one member of the group consisting of alkylating, hydroxyalkylating, aralkylating and acylating agents, without forming ammonium compounds, and finally sulphonating the so treated compounds.

6. A process for the manufacture of a water soluble, high molecular α-substituted aralkylamine, comprising dissolving α-undecyl-N-benzyl-benzamide in sulphuric acid monohydrate at 0° C., adding slowly at this temperature fuming sulphuric acid of 26 per cent strength, stirring until complete solubility in water is obtained and neutralizing the reaction mass at 0–10° C. after having poured it on ice.

7. A process for the manufacture of a water soluble, high molecular α-substituted aralkylamine, comprising heating α-undecyl-benzylamine with an alkylating agent in the presence of anhydrous sodium carbonate at about 100° C. until complete solubility in water is reached.

8. A process for the manufacture of a water soluble, high molecular α-substituted aralkylamine, comprising heating α-undecylbenzylamine with dimethylsulphate in the presence of anhydrous sodium carbonate at about 100° C. complete solubility in water is reached.

9. A process for the manufacture of a water soluble, high molecular α-substituted aralkylamine, comprising heating α-undecylbenzylamine in the presence of anhydrous sodium carbonate with diethylsulphate to form the tertiary α-undecyl-benzyldiethylamine, adding dimethylsulphate and heating at about 100° C. until complete solubility in water is reached.

10. Water-soluble, high molecular α-substituted aralkylamines consisting of aralkylamines of the general formula

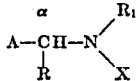

wherein R means a member of the group consisting of alkyl, aralkyl and aryl, $R_1$ means a member of the group consisting of hydrogen, alkyl, hydroxy-alkyl and aralkyl, X means a member of the group consisting of hydrogen, alkyl, hydroxy-alkyl, aralkyl and acyl and A represents a nucleus of one of the benzene and naphthalene series, these compounds containing a high molecular aliphatic radical of at least 8 C-atoms and a quaternary ammonium group, such compounds having excellent capillary-active effects and other valuable properties for textile industry.

11. A water-soluble, high molecular α-substituted arylalkylamine having excellent capillary-active effects and other valuable properties for textile industry, consisting of the compound of the formula

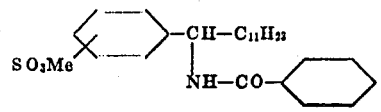

Me being one of the group consisting of H, $NH_4$, Na and K.

12. Water-soluble, high molecular α-substituted aralkylamines having excellent capillary-active effects and other valuable properties for textile industry, consisting of the compounds of the formula:

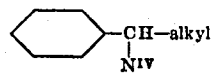

wherein alkyl means a high molecular aliphatic radical of at least 8 C-atoms and $N^{IV}$ represents a quaternary amino group.

13. A water-soluble, high molecular α-substituted arylalkylamine having excellent capillary-active effects and other valuable properties for textile industry, consisting of the compound of the formula

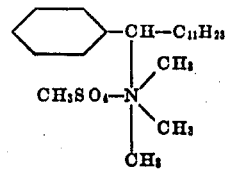

14. A water-soluble, high molecular α-substituted arylalkylamine having excellent capillary-active effects and other valuable properties for textile industry, consisting of the compound of the formula

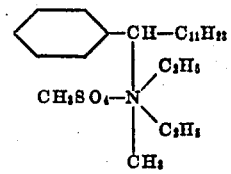

CARL METTLER.
HENRY MARTIN.
OTTO NERACHER.
ALFRED STAUB.